United States Patent Office 3,271,430
Patented Sept. 6, 1966

3,271,430
N-PERFLUOROACYL POLYALKYLENIMINES
Fred N. Teumac, Lake Jackson, Tex., assignor to The Dow Chemical Company, Midland, Mich., a corporation of Delaware
No Drawing. Filed Feb. 7, 1963, Ser. No. 256,844
4 Claims. (Cl. 260—404.5)

This invention relates to new compositions of matter and to a method for their preparation. It is particularly concerned with new polymeric fluorine-containing surfactants.

Polymeric amides obtained by the condensation of an alkylenimine or polyalkylenimine with organic acids or their derivatives are known and have been used as surface active agents, dye assistants, and the like. It has now been found that when the acid reactant is a perfluorinated saturated aliphatic carboxylic acid or derivative thereof, the polymeric amides thereby produced are not only superior surface active agents, but are also possessed of chemical properties which make possible their utilization in new and hitherto impractical applications.

The N-perfluoroacyl polyalkylenimines of this invention are preferably derived from monocarboxylic acids of the class described which contain from two to about twelve carbon atoms, for example, trifluoroacetic acid, heptafluorobutyric acid, pentadecafluorocaprylic acid, nonadecafluorocapric acid, perfluorolauric acid, and the like. The free acid or its lower alkyl ester, anhydride, amide, or halide may be employed in the reaction. Mixtures of two or more such acids or their derivatives may be used.

Vicinal alkylenimines such as ethylenimine, propylenimine, and butylenimine are preferred imine reactants. Ethylenimine yields products having most advantageous properties. These imines may be employed as one or more of the monomeric imines or as the polymeric forms of these. Products containing from about 10 to about 100 alkylenimine units to each perfluoroacyl group are preferred.

The condensation products thereby obtained are viscous liquids or waxy solids which are more or less soluble in water, depending upon the size of the perfluoroacyl group and the number of alkylenimine units present in the polymer molecule. Products having the most valuable properties are those wherein the perfluoroacyl groups comprise the residue of at least one acid of 4–10 carbon atoms. Products with particularly good surface active properties are obtained by reacting about 20–75 moles of ethylenimine with one mole of perfluorinated acid of this class.

These materials are most conveniently prepared by adding a suitable acid or mixture of acids to the monomeric alkylenimine while maintaining the reaction temperature at or below about 30° C. until all the reactants have been combined, then raising the temperature to cause polymerization of the excess imine with the low molecular weight adducts first formed. Usually temperatures of 50–100° C. are sufficient to obtain complete reaction.

The use of an acid derivative rather than the free acid itself may require some modification of these reaction conditions. For example, when a lower alkyl ester of the perfluoroacid is reacted, a small quantity of an acid such as used to catalyze esterification is necessary to obtain a practical rate of reaction.

The perfluoroacid or derivative thereof may also be reacted with the polyalkylenimine, in which case reaction temperatures above room temperature are required. Polymeric surfactants of somewhat higher molecular weight are more easily obtained by this method.

EXAMPLE 1

A small reactor flask was equipped with a mechanical stirrer and reflux condenser and was immersed in a cooling bath. To 26 g. of monomeric ethylenimine in the flask there was added 4 g. of pentadecafluorocaprylic acid at about 25° C. After all the acid had been added, the cooling bath was removed, whereupon the temperature of the reaction mixture rose to reflux temperature as the exothermic reaction proceeded. The reaction product was an extremely viscous liquid which consisted essentially of pentadecafluorooctanoyl polyethylenimine of an average molecular weight of about 1600 together with a small quantity of water of reaction.

EXAMPLE 2

By the procedure of Example 1, one part by weight of pentadecafluorocaprylic acid was reacted with five parts of ethylenimine to obtain an N-pentadecafluorooctanoyl polyethylenimine product of similar appearance. This product was unusually effective as a surfactant in aqueous systems. When dissolved in water in very small concentrations by weight, the resulting solutions had greatly reduced surface tensions as shown below. Values for surface tension are given in dynes per centimeter at 25° C.

| Percent concentration | 0.05 | 0.0065 | 0.0015 |
|---|---|---|---|
| Surface tension | 19.2 | 26.5 | 43.0 |

EXAMPLE 3

By the procedure of Example 1, 15 parts by weight of ethylenimine was reacted with one part of heptafluorobutyric acid to obtain a product of similar appearance and properties. This product had an average molecular weight of 3000.

EXAMPLES 4–8

As shown in Example 1, similar reactions were carried out using various acids or mixtures of acids in different imine/acid molecular proportions. The results are listed below with the proportions of reactants given in parts by weight.

| Example No. | Reactants | Parts | Mol. Wt. Product |
|---|---|---|---|
| 4 | Ethylenimine | 5 | 1,220 |
|   | $C_7F_{15}CO_2H$ | 2 |   |
| 5 | Ethylenimine | 36 | 7,700 |
|   | $C_7F_{15}CO_2H$ | 1.4 |   |
|   | $C_3F_7CO_2H$ | 4 |   |
| 6 | Ethylenimine | 36 | 1,070 |
|   | $C_7F_{15}CO_2H$ | 2 |   |
|   | $C_3F_7CO_2H$ | 8 |   |
| 7 | Ethylenimine | 39 | 1,420 |
|   | $C_7F_{15}CO_2H$ | 2 |   |
|   | $CF_3CO_2H$ | 4 |   |
| 8 | Ethylenimine | 75 | 620 |
|   | $C_7F_{15}CO_2H$ | 2 |   |
|   | $CF_3CO_2H$ | 4 |   |

Products from the above experiments were similar in appearance to that obtained in Example 1. Some of the average molecular weights listed are deceptively low because of the presence in the products of low molecular weight materials which could not easily be removed.

The products of this invention are valuable surface active agents which are effective in reducing surface tension in water and are particularly useful in aqueous solutions of strong acids and bases. Table I shows the effect of some representative products on the surface tension of water. Values for surface tension are given in dynes per centimeter and were determined at 25° C. using various concentrations by weight of the products.

*Table I*

| Product of Example— | Surface Tension | | |
|---|---|---|---|
| | At 0.1% | At 0.01% | At 0.002% |
| 1 | 19.2 | 27.3 | 43.5 |
| 4 | 18.5 | 36.2 | |
| 5 | 19.5 | 34.0 | |
| 7 | 30.5 | 48.0 | |
| 8 | 24.5 | 47.0 | |

These materials are surprisingly resistant to chemical attack as compared to similar non-fluorinated surfactants and they are, therefore, particularly useful in systems comprising strongly corrosive chemicals. For example, the product of Example 5 when used in 0.0007% by weight concentration, reduced the surface tension of 17% NaOH solution from about 77 dynes to 28.5 dynes at 50° C. The same surfactant reduced the surface tension of 12% $HNO_3$ at room temperature from about 71 dynes to 21 dynes when added in about 0.05% concentration.

I claim:
1. An N-perfluoroacyl polyalkylenimine wherein perfluoroacyl is the residue of a perfluorinated alkanoic acid of 2 to about 12 carbon atoms and there are present in the perfluoroacyl polyalkylenimine molecule from about 10 to about 100 alkylenimine units for each perfluoroacyl group, each alkenylenimine unit containing from 2–4 carbon atoms.
2. An N-perfluoroacyl polyethylenimine wherein perfluoroacyl is the residue of a perfluorinated alkanoic acid of 2 to about 12 carbon atoms and there are present in the perfluoroacyl polyethylenimine molecule from about 10 to about 100 ethylenimine units for each perfluoroacyl group.
3. The perfluoroacyl polyethylenimine of claim 2 wherein perfluoroacyl is the residue of at least one acid of 4–10 carbon atoms.
4. N-pentadecafluorooctanoyl polyethylenimine wherein there are present about 20–75 ethylenimine units per pentadecafluorooctanoyl group.

References Cited by the Examiner
UNITED STATES PATENTS
2,382,185  8/1945  Ulrich _____ 260—404
2,764,603  9/1956  Ahlbrecht _____ 260—404.5

CHARLES B. PARKER, *Primary Examiner.*

JOSEPH P. BRUST, ANTON H. SUTTO,
*Assistant Examiners.*